United States Patent
Fukushima

(10) Patent No.: US 11,933,799 B2
(45) Date of Patent: Mar. 19, 2024

(54) AUTOMATIC SAMPLE INJECTION DEVICE

(71) Applicant: Shimadzu Corporation, Kyoto (JP)

(72) Inventor: Daiki Fukushima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 243 days.

(21) Appl. No.: 17/468,538

(22) Filed: Sep. 7, 2021

(65) Prior Publication Data
US 2022/0128584 A1    Apr. 28, 2022

(30) Foreign Application Priority Data
Oct. 26, 2020   (JP) .................................. 2020-178625

(51) Int. Cl.
*G01N 35/02* (2006.01)
*G01N 35/00* (2006.01)

(52) U.S. Cl.
CPC ..... *G01N 35/025* (2013.01); *G01N 35/00623* (2013.01); *G01N 2035/00643* (2013.01)

(58) Field of Classification Search
CPC ........... G01N 35/025; G01N 35/00623; G01N 2035/00643; G01N 35/0092; G01N 35/1004; G01N 35/1095; G01N 2035/0439; G01N 35/04; G01N 30/16
See application file for complete search history.

(56) References Cited

U.S. PATENT DOCUMENTS

| 2018/0059071 A1* | 3/2018 | Murata ................. G01N 30/24 |
| 2020/0110063 A1 | 4/2020 | Fukushima et al. |
| 2022/0373569 A1* | 11/2022 | Davis ..................... B01L 3/545 |

FOREIGN PATENT DOCUMENTS

| CN | 110988375 A | 4/2020 |
| JP | H09-325153 A | 12/1997 |
| JP | 2019215250 A | 12/2019 |

OTHER PUBLICATIONS

First Office Action dated Aug. 11, 2023 from the Chinese Patent Office for corresponding Chinese Patent Application No. 202111230717.1.

* cited by examiner

*Primary Examiner* — Jill A Warden
*Assistant Examiner* — John McGuirk
(74) *Attorney, Agent, or Firm* — Muir Patent Law, PLLC

(57) ABSTRACT

An automatic sample injection device includes: an; and a management device. The injector includes: a turret; and a vial sensor. The management device includes: a condition setting unit configured to set a condition relating to a type of a vial to be used in the sample injection operation, based on information input by a user; and a vial determination unit configured to determine, before the injector initiates the sample injection operation, whether or not there is a missing vial on the turret out of the vials of the plurality of types set to be used in the sample injection operation under a condition set by the condition setting unit, by using a detection result of the vial sensor.

5 Claims, 4 Drawing Sheets

AUTOMATIC SAMPLE INJECTION DEVICE

CROSS-REFERENCE TO RELATED APPLICATIONS

This application claims priority under 35 U.S.C. § 119 to Japanese Patent Application No. 2020-178625 filed on Oct. 26, 2020, the entire disclosure of which is incorporated herein by reference in its entirety.

BACKGROUND OF THE INVENTION

Field of the Invention

The present invention relates to an automatic sample injection device for a gas chromatography analysis.

Description of the Related Art

An automatic sample injection device for automatically injecting a sample into an analysis device for performing a gas chromatography analysis is known (see Patent Document 1). The automatic sample injection device is provided with an injector for performing a series of operations (hereinafter referred to as "sample injection operations") related to a sample injection into an analysis device. The injector is provided with a turret on which a plurality of vials each for accommodating a liquid, such as, e.g., a sample and a solvent, is loaded, and a syringe for sucking and dispensing the liquid from the vial on the turret.

The sample injection operations to be performed by the injector include a plurality of steps. The plurality of steps includes a step of cleaning a syringe using a solvent before injecting a sample, a step of co-cleaning the syringe by the sample, and a step of cleaning the syringe after injecting the sample. Conditions, such as the type of the solvent used in each step and the number of times of cleaning using the solvent, are set in advance by a user. The injector performs the sample injection operation according to the sequence information based on each condition set by the user.

PRIOR ART DOCUMENT

Patent Document

Patent Document 1: Japanese Unexamined Patent Application Publication No. H09-325153

SUMMARY OF THE INVENTION

Problems to be Solved by the Invention

In order for the injector to perform a sample injection operation as per the sequence based on the conditions set by the user, it is required that required vials have been correctly loaded at given locations on the turret. In a case where the user forgot to load required vials on the turret or mistook the vial load locations, the injector cannot perform the sample injection operations correctly. This adversely affects the analysis results.

Therefore, the following countermeasures may be taken at the time of performing each step. That is, it is detected whether or not a vial has been loaded at a predetermined position on the turret by a photosensor or the like. In a case where a vial has not been loaded, an error is issued to suspend the sample injection operation or skip the step. According to such a countermeasure, however, in a case where the same vial is to be used in a plurality of steps, the presence or absence of the same vial is repeatedly confirmed. This wastes time. When the sample injection operation is interrupted by an error in a case where an automatic analysis is scheduled in a state in which the user is absent, the sample injection operation will remain interrupted until the user returns. This deteriorates the analysis efficiency. Further, in a case where it is detected that no waste liquid vial has been loaded at a predetermined position immediately before the step of discarding the waste liquid sucked in the syringe, there is no place to discard the liquid sucked into the syringe. Therefore, the liquid continuously remains in the syringe. Therefore, depending on the nature of the liquid, it can be a cause of failure.

The present invention has been made in view of the above problems. One of the objects of the present invention is to provide an automatic sample injection device capable of preventing the initiation of a sample injection operation in a state in which a vial required to perform the sample injection operation has not been loaded at a predetermined location of the turret.

Means for Solving the Problem

An automatic sample injection device according to the present invention is provided with: an injector configured to perform a sample injection operation to an analysis device, the sample injection operation including a plurality of steps; and a management device configured to perform operation management of the injector. The injector includes: a turret configured so that a plurality of vials are loaded at preset locations on the turret, the vials being used in the sample injection operation and types of the vials are distinguished by property or application of liquid to be accommodated therein; and a vial sensor configured to detect whether or not the vial has been loaded at a predetermined location on the turret. The management device includes: a condition setting unit configured to set a condition relating to a type of a vial to be used in the sample injection operation, based on information input by a user; and a vial determination unit configured to determine, before the injector initiates the sample injection operation, whether or not there is a missing vial on the turret out of the vials of the plurality of types set to be used in the sample injection operation under a condition set by the condition setting unit, by using a detection result of the vial sensor

Effects of the Invention

According to the automatic sample injection device of the present invention, it is configured such that after the setting of the condition of the injector during the sample injection operation based on the information input by the user and before the initiation of the sample injection operation based on the condition, it is configured to detect whether or not there is a missing vial on the turret out of the vial of a type used in the sample injection operation. Therefore, it is possible to know whether or not there is a missing vial required to perform the sample injection operation on the turret out of the vials of types to be used in the sample injection operation before the initiation of the sample injection operation. With this, it is possible to prevent the initiation of the sample injection operation from in a state in which a vial required for performing the sample injection operation has not been loaded at the predetermined location on the turret.

EMBODIMENTS FOR CARRYING OUT THE INVENTION

Hereinafter, referring to the attached drawings, an example of an automatic sample injection device according to the present invention will be described.

Figure 1:
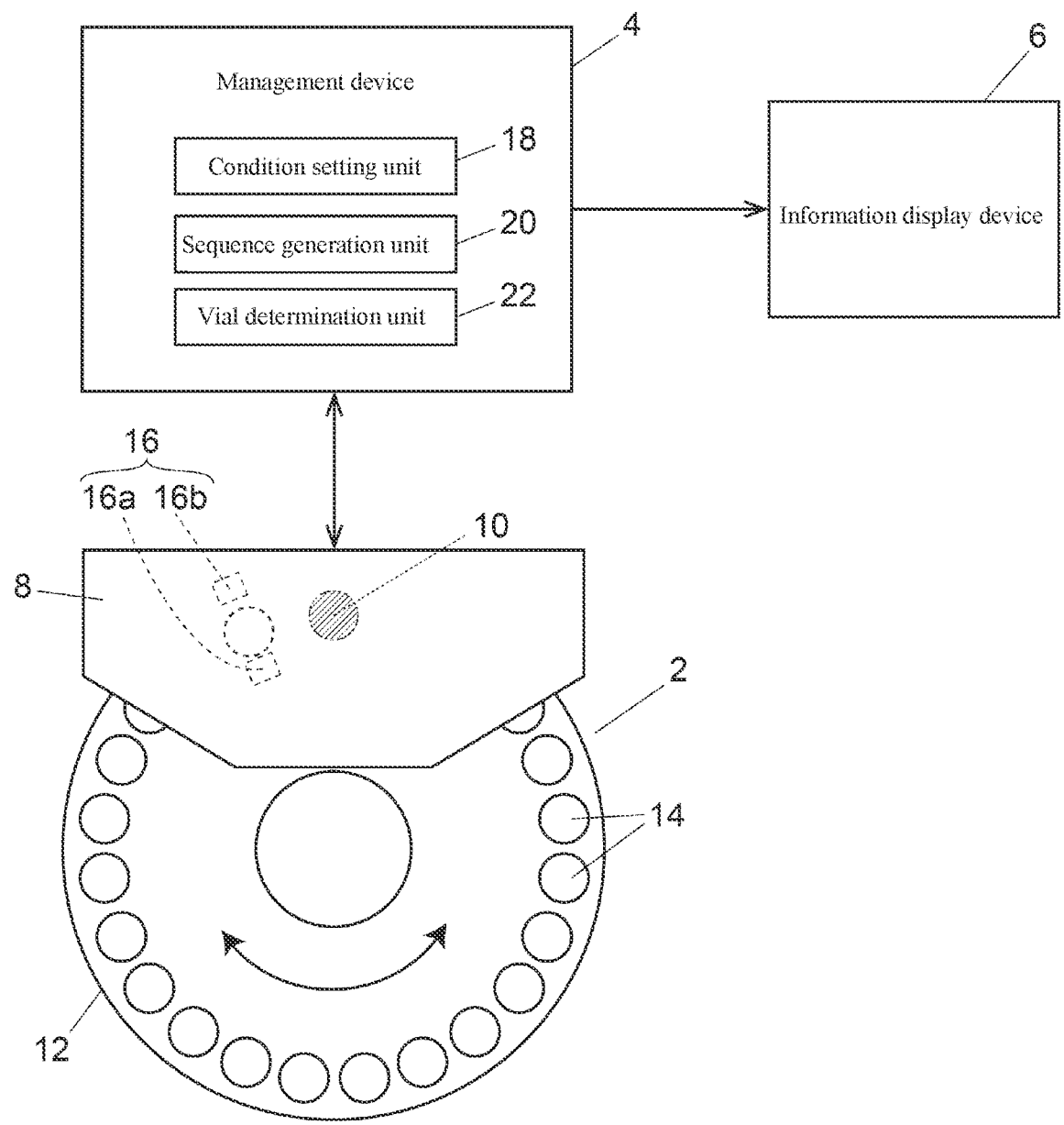
FIG. 1 is a schematic configuration diagram showing one example of an automatic sample injection device.

As shown in FIG. 1, the automatic sample injection device is provided with an injector 2, a management device 4, and an information display device 6. The injector 2 is arranged on a housing of an analysis device for performing a gas chromatography analysis, and is configured to inject a sample into an injection port provided on the upper surface of the housing of the analysis device. The injector 2 performs a sample injection operation to the analysis device according to the sequence information provided by the management device 4. The sample injection operation includes a plurality of steps, such as, e.g., a step of cleaning the syringe 10 before the sample injection, a step of injecting the sample into the analysis device, and a step of cleaning the syringe 10 after the sample injection. The conditions, such as, e.g., a type of a solvent used in each step and the number of times of the cleaning using the solvent, are set by the user at the management device 4.

The injector 2 is provided with an injector body 8 and a turret 12. The injector body 8 is provided with the syringe 10 for sucking and discharging a liquid. The injector body 8 can move the syringe 10 vertically with its tip facing vertically downward. The turret 12 is a disk-shaped table and has a plurality of vial holders 14 on its upper surface. The plurality of vial holders 14 are arranged on the same circumference. At each vial holder 14, a vial accommodating a solvent, a vial accommodating a sample, a vial for storing a waste liquid, and the like are loaded. The turret 12 rotates in a horizontal plane about the center of the circumference in which the vial holders 14 are arranged, and an arbitrary vial loaded on the vial holder 14 can be arranged directly below the syringe 10.

Figure 4:
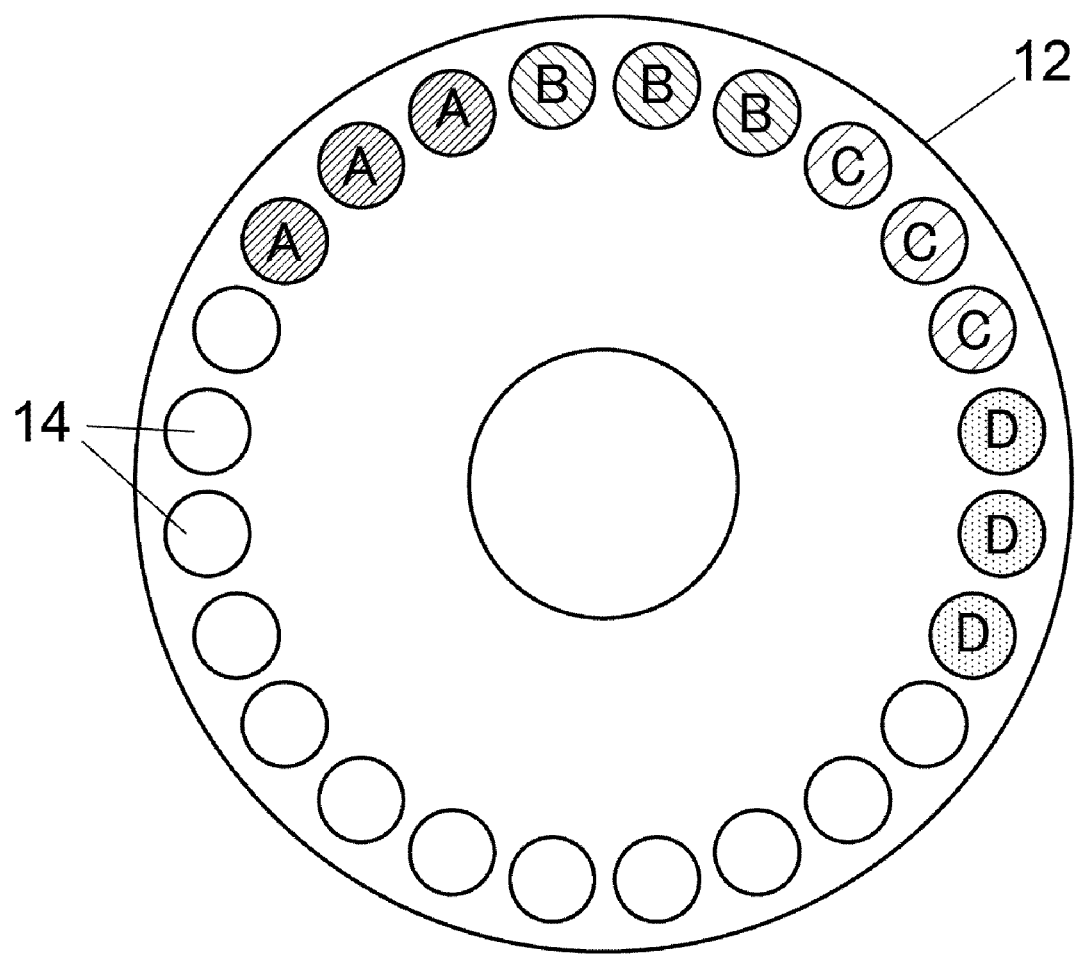
FIG. 4 is an example of a solvent vial load location set on a turret.

As shown in FIG. 4, a plurality of vials accommodating solvents that differ from each other can be loaded on the turret 12. The locations of the vials accommodating the respective solvents (vial holder 14) are pre-defined. In the example of FIG. 4, three sets of vial holders 14 each for loading vials accommodating solvents of four types, i.e., a solvent A, a solvent B, a solvent C, and a solvent D, respectively, are prepared. Up to three sets of vials each accommodating the respective solvents A to D can be placed on the turret 12.

Here, vials accommodating the same solvent are vials of the same type. Therefore, when there are three vials each accommodating a solvent A, these three vials are vials of the same type. On the other hand, a vial accommodating a solvent A and a vial accommodating a solvent B are vials of types different from each other. Vials for storing various solvents and vials for storing waste liquids are vials of types different from each other. In other words, types of vials are not distinguished by vials themselves, but are distinguished by property or application of liquid to be accommodated therein.

Returning to FIG. 1, the injector 2 is provided with a vial sensor 16 for detecting whether or not vials have been loaded on the respective vial holders 14 of the turret 12. In this example, the vial sensor 16 is a transmissive photosensor having a light-emitting portion 16a and a light-receiving portion 16b. The vial sensor 16 can optically detect whether or not a vial has been loaded on the vial holder 14 located at a predetermined position in the vicinity of the syringe 10.

The management device 4 is implemented by a general-purpose personal computer or a dedicated computer. To the management device 4, the information display device 6, such as, e.g., a liquid crystal display for performing various information displays is communicably connected.

The management device 4 is provided with a condition setting unit 18, a sequence generation unit 20, and a vial determination unit 22. The condition setting unit 18, the sequence generation unit 20, and the vial determination unit 22 are functions attained by executing predetermined programs by a CPU in the management device 4.

The condition setting unit 18 is configured to set conditions in each step of the sample injection operation based on the information input by a user. The conditions set by the condition setting unit 18 include the type of the sample (e.g., solvent A, solvent B) used in the cleaning step before the sample injection and the cleaning step after the sample injection, the number of cleaning performed by using each solvent, or the like.

The sequence generation unit 20 is configured to generate the sequence information in each step included in the sample injection operation based on the conditions set by the condition setting unit 18. The sequence information generated by the sequence generation unit 20 includes, for example, the information indicating which vial of each solvent loaded on the turret 12 when cleaning using each solvent is used. For example, in a case where it is set by the condition setting unit 18 such that cleaning using the solvent A is performed three times in the cleaning step of the syringe 10 before the sample injection, and two vials each accommodating the solvent A are loaded on the turret 12, the sequence generation unit 20 generated the following sequence information. That is, the sequence generation unit 20 generates sequence information on the cleaning operation by setting which vial is used in each of the first, second, and third cleaning using the solvent A. In other words, the sequence generation unit 20 generates sequence information on the cleaning operation by setting which solvent A accommodated in which vial is to be used.

The vial determination unit 22 is configured to determine whether or not there is a missing vial on the turret 12 out of the vials of the type set to be used in the sample injection operation by the condition setting unit 18, based on the detection result of the vial sensor 16. The determination target vial according to the vial determination unit 22 includes, in addition to a solvent vial for accommodating various solvents, a waste liquid vial for storing a waste liquid. For example, in a case where it is set to use the solvents A, B, and D in the cleaning step of the syringe 10 before the sample injection, the vial determination unit 22 determines as follows. That is, the vial determination unit 22 determines whether or not there is at least one vial accommodating the solvent A, B, and D on the turret 12 and whether or not there is a waste liquid vial for storing a solvent used for cleaning on the turret 12.

Figure 2:
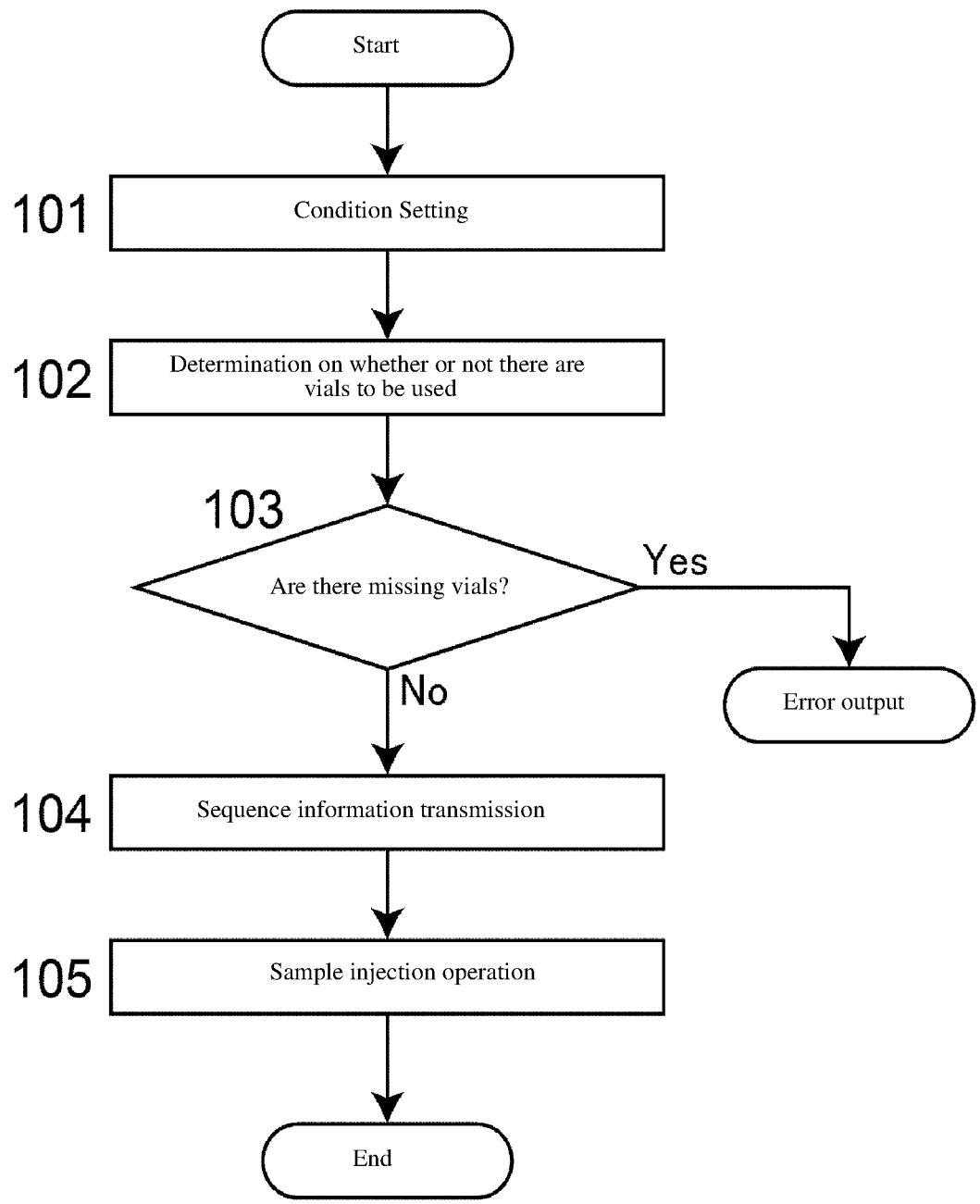
FIG. 2 is a flowchart showing an example of operations from the condition setting to the sample injection operation in the example.

One example of operations from the condition setting to the sample injection operation will be described using the flowchart of FIG. 2 and FIG. 1.

The condition setting unit 18 sets the condition of each step of the sample injection operation based on the information input by a user (Step 101). After the condition of each step is set by the condition setting unit 18, the sequence generation unit 20 generates sequence information on each step. At that time, the vial determination unit 22 determines whether or not a vial of the type set to be used in each step has been loaded on the turret 12 (Step 102). In a case where a vail of the type set to be used has not been loaded on the turret 12, that is, some vials have not been loaded on the turret 12 (Step 103: Yes), the vial determination unit 22 outputs an error. For example, the vial determination unit 22 displays the missing type of the vial on the information display device 6.

In a case where vials of all of the types required for performing the sample injection operation have been loaded on the turret 12 (Step 103: No), the sequence generation unit 20 generates the sequence information for each step and transmits it to the injector 2 (Step 104). The injector 2 performs the sample injection operation to an analysis device based on the sequence information generated by the sequence generation unit 20 (Step 105).

Figure 3:
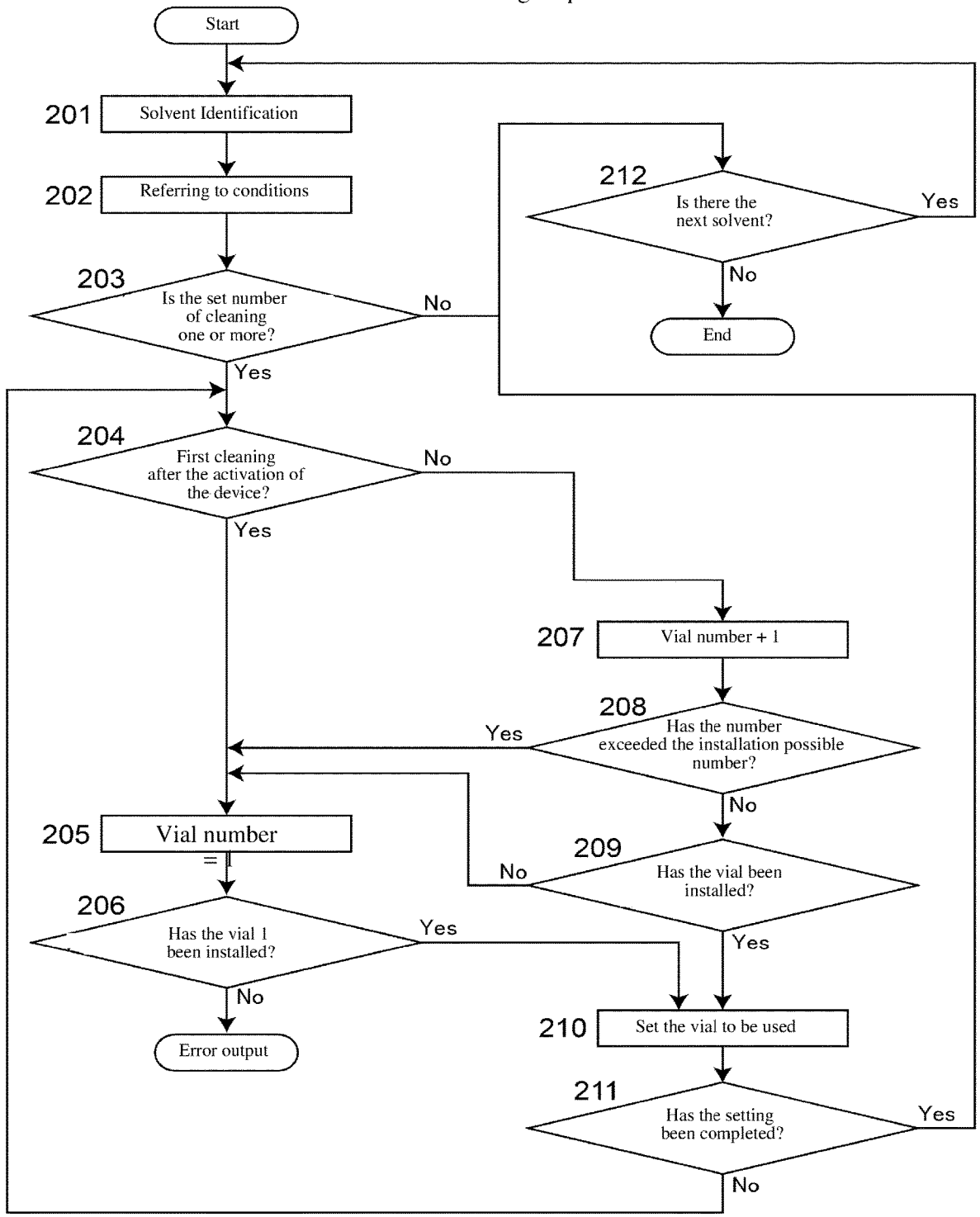
FIG. 3 is a flowchart showing an example of cleaning sequence generation operations in the example.

Next, an example of operations of generating sequence information (cleaning sequence) in the cleaning step before and/or after the sample injection will be described using the flowchart of FIG. 3 and FIG. 1.

Here, it is assumed that, as shown in FIG. 4, three vials each accommodating the solvent A to D can be loaded on the turret 12, and these three vials accommodating the same solvent are defined as a vial 1, a vial 2, and a vial 3. The sequence generation unit 20 sets which vial between the vials 1 to 3 will be used to accommodate each solvent A to D (use vial) in each cleaning step using each solvent A to D, for each solvent.

First, the sequence generation unit 20 identifies a target solvent (Step 201). Herein, the description will be made, assuming that a solvent A has been identified as the target solvent. The sequence generation unit 20 refers to the number of cleaning by the solvent A set by the condition setting unit 18 (Step 202). In a case where the number of times of cleaning by the solvent A is set to one or more (Step 203: Yes), the sequence generation unit 20 confirms whether or not the cleaning intended to set the use vial is cleaning in the first analysis using the solvent A after the activation of the device (Step 204).

In a case where the cleaning is cleaning in the first analysis using the solvent A after the activation of the device (Step 204: Yes), the sequence generation unit 20 tentatively sets the vial number to 1 (i.e., vial 1) (Step 205). The vial determination unit 22 determines whether or not a vial has been loaded on the vial holder 14 on which the vial 1 of the solvent A is to be loaded, using the detection result of the vial sensor 16 (Step 206). In a case where the vial 1 of the solvent A has been loaded (Step 206: Yes), the sequence generation unit 20 sets the vial to be used in the cleaning to a "vial 1" (Step 210). On the other hand, in a case where the vial 1 of the solvent A has not been loaded (Step 206: No), the vial determination unit 22 outputs an error.

Further, in a case where the cleaning is cleaning in the second and subsequent analyses using the solvent A after the activation of the device (Step 204: No), the sequence generation unit 20 tentatively sets a vial number. In other words, the sequence generation unit 20 tentatively sets the number "n+1" obtained by setting+1 to the vial number n of the vial used in the previous cleaning (cleaning in which the vial to be used is set immediately before) as a vial number (i.e., vial n+1) of a vial to be used in the cleaning (Step 207). For example, in a case where the cleaning is cleaning in a second analysis, the vial to be used is tentatively set to a vial 2. Further, in a case in which the cleaning is cleaning in the third analysis and the vial to be used in the cleaning in the second analysis is set to vial 2 (i.e., n=2), the vial to be used in the cleaning is tentatively set to a vial 3 (i.e., 2+1).

In a case where the tentatively set vial number "n+1" exceeds the loadable number (3 in this example) of vials of the solvent A (Step 208: Yes), the sequence generation unit 20 sets the vial to be used in the cleaning to a "vial 1" (Steps 205, 206, and 210). On the other hand, in a case where the tentatively set vial number "n+1" does not exceed the loadable number of vials of the solvent A (Step 208: No), the vial determination unit 22 determines whether or not a vial has been loaded on the vial holder 14 on which the vial n+1 of the solvent A is to be loaded using the detection result of the vial sensor 16 (Step 209). In a case where the vial n+1 of the solvent A has been loaded on the turret 12 (Step 209: Yes), the sequence generation unit 20 sets the vial to be used in the cleaning to the "vial n+1" (Step 210). On the other hand, in a case where the vial n+1 of the solvent A has not been loaded on the turret 12 (Step 209: No), the sequence generation unit 20 sets the vial to be used in the cleaning to a "vial 1" (Steps 205, 206, 210). In other words, in a case where it is set such that the vial of the same type is used a plurality of times, the vial determination unit 22 determines whether or not a plurality of vials of the type has been loaded on the turret 12. Then, the sequence generation unit 20 sets the vial to be used in each cleaning based on the determination result of the vial determination unit 22.

The above-described operation is performed by the number of times of the cleaning set for the solvent A (Step 211), and the use vial to be used in each of the set number of cleaning is set. Thereafter, for the subsequent solvent (solvent B), Steps 201 to 211 are performed in the same manner (Step 212). As described above, by performing the above-described steps 201 to 211 for all of the solvents A to D, the vial to be used for each of the solvents A to D in the cleaning step is set. With this, the sequence in the cleaning step is set. The sequence generated here is provided to the injector 2. The injector 2 performs the cleaning using the respective solvents A to D according to the provided sequence.

According to the above-described operation, in a case where the number of times of the cleaning using the solvent A is set to four in a state in which two vials (vial 1 and vial 2) for accommodating the solvent A have been loaded on the turret 12, the following cleaning sequence is generated. That is, a cleaning sequence is generated in which the vial 1 is used in the first cleaning using the solvent A, the vial 2 is used in the second cleaning using the solvent A, the vial 3 is used in the third cleaning using the solvent A, and the vial 4 is used in the fourth cleaning using the solvent A. Further, in a case where the number of times of the cleaning using the solvent A is set to four in a state in which only one vial (vial 1) for accommodating the solvent A has been loaded on the turret 12, the following cleaning sequence is generated. That is, a cleaning sequence is generated in which the vial 1 is used in all cleaning using the solvent A. As described above, provided that the vial 1 for each solvent to be used in the cleaning step has been loaded at a predetermined location on the turret 12, a sequence is generated without causing an error, and the sample injection operation including the cleaning step is performed.

The described example merely shows an example of an embodiment of the automatic sample injection device according to the present invention. The embodiment of the automatic sample injection device according to the present invention is as follows.

According to one embodiment of the present invention, an automatic sample injection device is provided with: an injector configured to perform a sample injection operation to an analysis device, the sample injection operation including a plurality of steps; and a management device configured to perform operation management of the injector. The injector includes: a turret configured so that a plurality of vials are loaded at preset locations, the vials being used for the sample injection operation and types of the vials being distinguished by property or application of liquid to be accommodated therein; and a vial sensor configured to detect whether or not the vial has been loaded at a predetermined location on the turret. The management device includes: a condition setting unit configured to set a condition relating to a type of a vial to be used in the sample injection operation, based on information input by a user; and a vial determination unit configured to determine, before the injector initiates the sample injection operation, whether or not there is a missing vial on the turret out of the vials of the plurality of types set to be used in the sample injection operation under a condition set by the condition setting unit, by using a detection result of the vial sensor.

Note that in this embodiment, a plurality of vials for accommodating the same liquid is defined as vials of the same type, and a plurality of vials for accommodating liquids different from each other is defined as vials of different types.

According to the first aspect of the above-described embodiment, the automatic sample injection device is configured as follows. The turret is configured to load a plurality of vials of the same type on the turret. The vial determination unit is configured to determine whether or not a vial of a type set to be used a plurality of times has been loaded on the turret in a case where the vials of the same type are set to be used a plurality of times in the sample injection operation by the condition setting unit. The management device further includes: a sequence generation unit configured to generate sequence information for the sample injection operation based on the condition set by the condition setting unit, the sequence generation unit being configured to generate the sequence information by setting the vial to be used in each of a plurality of steps, based on a determination result of the vial determination unit. The injector is configured to perform the sample injection operation based on the sequence information generated by the sequence generation unit.

With the above-described configuration, the sequence corresponding to the number of various vials loaded on the turret is automatically generated. Therefore, there is no need for the user to generate the sequence in view of the number of various vials loaded on the turret, which can reduce the user's setting burden on the sample injection operation.

According to the above-described first aspect of the embodiment, it may be configured such that in a case where it is detected from the determination result of the vial determination unit that a plurality of vials for accommodating the same solvent set to be used a plurality of times in the sample injection operation has been loaded on the turret, the sequence generation unit is configured to assign a plurality of usages of the solvent to the plurality of vials for accommodating the solvent.

In this case, in a case where the user has loaded a plurality of vials accommodating the same solvent on the turret, even if the user does not set the number of vials for accommodating each solvent, the plurality of vials loaded on the turret can be used evenly.

According to a second aspect of the above-described embodiment, the vial determination unit is configured to output an error in a case where the vial determination unit determines that a vial of a determination target type of the vial determination unit has not been loaded on the turret.

With the above-described configuration, the user can easily recognize that the condition setting of the sample injection operation and the load state of vials on the turret do not correspond to each other. This second aspect can be combined with the first aspect described above.

According to a third aspect of the above-described embodiment, the vial of a determination target type of the vial determination unit includes a solvent vial for accommodating a solvent. This third aspect can be combined with the first aspect and/or the second aspect.

According to a fourth aspect of the above-described embodiment, the vial of a determination target type of the vial determination unit includes a waste liquid vial for accommodating a waste liquid. The third aspect may be combined with the first aspect, the second aspect, and/or the third aspect.

DESCRIPTION OF SYMBOLS

2: Injector
4: Management device
6: Information display device
8: Injector body
10: Syringe
12: Turret
14: Vial holder
16: Vial sensor
16a: Light-emitting unit
16b: Light-receiving unit
18: Condition setting unit
20: Sequence generation unit
22: Vial determination unit

The invention claimed is:

1. An automatic sample injection device comprising:
an injector configured to perform a sample injection operation to an analysis device, the sample injection operation including a plurality of steps; and
a management device configured to perform operation management of the injector,
wherein the injector includes:
a turret configured so that a plurality of vials are loaded at preset locations on the turret, wherein the vials are used in the sample injection operation and types of the vials are distinguished by composition or application of liquid to be accommodated therein; and
a vial sensor configured to detect whether or not a vial of the plurality of vials has been loaded at a predetermined location on the turret,
wherein the management device includes a processor configured to:
set a condition relating to a type or types of vials to be used in the sample injection operation, based on information input by a user; and
determine, before the injector initiates the sample injection operation, whether or not there is a missing vial on the turret out of the vials of the type or types set to be used in the sample injection operation under the set condition, by using a detection result of the vial sensor, wherein the turret is configured so that a plurality of vials of the same type can be loaded on the turret, wherein the processor is configured to determine whether or not a vial of a type set to be used a plurality of times has been loaded on the turret in a case where the plurality of vials of the same type are set to be used a plurality of times in the sample injection operation, wherein the processor is further configured to generate sequence information for the sample injection operation based on the set condition, by generating the sequence information by setting the vial to be used in each of a plurality of steps, based on a determination result of the processor indicating whether or not the vial of the type set to be used the plurality of times has been loaded on the turret, and wherein the injector is configured to perform the sample injection operation based on the sequence information generated by the processor.

2. The automatic sample injection device as recited in claim 1, wherein in a case where it is detected from the determination result that a plurality of vials for accommodating the same solvent set to be used a plurality of times in the sample injection operation has been loaded on the turret, the processor is configured to assign a plurality of usages of the solvent to the plurality of vials for accommodating the solvent.

3. The automatic sample injection device as recited in claim 1, wherein the processor is configured to output an error in a case where the processor determines that a vial of a determination target type has not been loaded on the turret.

4. The automatic sample injection device as recited in claim 1, wherein a vial of a determination target type includes a solvent vial for accommodating a solvent.

5. The automatic sample injection device as recited in claim 1, wherein a vial of a determination target type includes a waste liquid vial for accommodating a waste liquid.

* * * * *